US010135059B2

(12) United States Patent
Huang et al.

(10) Patent No.: US 10,135,059 B2
(45) Date of Patent: Nov. 20, 2018

(54) CRUMPLED PARTICLES, METHODS OF SYNTHESIZING SAME AND APPLICATIONS USING SAME

(75) Inventors: Jiaxing Huang, Wilmette, IL (US); Hee Dong Jang, Daejeon (KR); Jiayan Luo, Evanston, IL (US)

(73) Assignee: NORTHWESTERN UNIVERSITY, Evanston, IL (US)

(*) Notice: Subject to any disclaimer, the term of this patent is extended or adjusted under 35 U.S.C. 154(b) by 734 days.

(21) Appl. No.: 13/537,686

(22) Filed: Jun. 29, 2012

(65) Prior Publication Data

US 2013/0004798 A1 Jan. 3, 2013

Related U.S. Application Data

(60) Provisional application No. 61/503,149, filed on Jun. 30, 2011.

(51) Int. Cl.

| | |
|---|---|
| ***C09C 1/46*** | (2006.01) |
| ***H01M 8/16*** | (2006.01) |
| ***H01M 4/04*** | (2006.01) |
| ***H01M 4/583*** | (2010.01) |
| ***H01M 4/88*** | (2006.01) |
| ***H01M 4/96*** | (2006.01) |
| ***B82Y 30/00*** | (2011.01) |

(Continued)

(52) U.S. Cl.
CPC ............... *H01M 4/04* (2013.01); *B82Y 30/00* (2013.01); *B82Y 40/00* (2013.01); *C01B 32/194* (2017.08); *H01M 4/583* (2013.01); *H01M 4/88* (2013.01); *H01M 4/96* (2013.01); *H01M 8/16* (2013.01); *C01P 2004/03* (2013.01); *C01P 2004/04* (2013.01); *C01P 2006/10* (2013.01); *Y02E 60/527* (2013.01)

(58) Field of Classification Search
CPC ............................. H01M 4/133; H01M 4/625
USPC ............................................................ 429/2
See application file for complete search history.

(56) References Cited

U.S. PATENT DOCUMENTS

2002/0164483 A1* 11/2002 Mercuri et al. ............... 428/408
2008/0292912 A1* 11/2008 Logan et al. ..................... 429/2
(Continued)

FOREIGN PATENT DOCUMENTS

WO 2011012874 A1 2/2011

OTHER PUBLICATIONS

Jang, "Synthesis of Graphene by Aerosol Assisted Self Assembly", AAAR 30th Annual Conference, Mar. 21, 2011.*
(Continued)

*Primary Examiner* — Miriam Stagg
*Assistant Examiner* — Brent C Thomas
(74) *Attorney, Agent, or Firm* — The Marbury Law Group PLLC

(57) ABSTRACT

In one aspect of the present invention, a method of for synthesizing compression- and aggregation-resistant particles includes forming a graphene dispersion solution with micron-sized graphene-based material sheets, nebulizing the graphene dispersion solution to form aerosol droplets, passing the aerosol droplets through a horizontal tube furnace pre-heated at a predetermined temperature by a carrier gas, and drying the aerosol droplets to concentrate and compress the micron-sized graphene-based material sheets into crumpled particles of sub-micron scale.

35 Claims, 8 Drawing Sheets

(51) Int. Cl.
*B82Y 40/00* (2011.01)
*C01B 32/194* (2017.01)

(56) References Cited

U.S. PATENT DOCUMENTS

| | | | | |
|---|---|---|---|---|
| 2009/0068470 | A1* | 3/2009 | Choi | B82Y 30/00 428/403 |
| 2010/0200839 | A1* | 8/2010 | Okai et al. | 257/29 |
| 2010/0301212 | A1* | 12/2010 | Dato | B82Y 30/00 250/311 |
| 2011/0292570 | A1* | 12/2011 | Ivanovici | B82Y 30/00 361/502 |
| 2012/0064409 | A1* | 3/2012 | Zhamu | B82Y 30/00 429/221 |

OTHER PUBLICATIONS

Stankovich, "Synthesis of graphene based nanosheets via chemical reduction of exfoliated graphite oxide", Carbon, vol. 45, pp. 1558-1565, 2007.*

Shih, "Bi and trilayer graphene solutions", Nature Nanotechnology, vol. 6, pp. 439-445, Jun. 26, 2011.*

Lobkovsky, A. et al., Scaling Properties of Stretching Ridges in a Crumpled Elastic Sheet, Science, 1995, vol. 270, 1482-1485.

Matan, K. et al., Crumpling a thin sheet, Phys. Rev. Lett., 2002, 076101, vol. 88, No. 7.

Vliegenthart, G. A. et al., Forced crumpling of self-avoiding elastic sheets, Nature Mater., 2006, vol. 5, 216-221.

Tallinen, T. et al., The effect of plasticity in crumpling of thin sheets, Nature Mater., 2009, vol. 8, 25-29.

Park, S. et al., Chemical methods for the production of graphenes, Nature Nanotech., 2009, vol. 4, 217-224.

Li, D. et al., Graphene-Based Materials, Science, 2008, vol. 320, 1170-1171.

Compton, O. C. et al., Graphene Oxide, Highly Reduced Graphene Oxide, and Graphene: Versatile Building Blocks for Carbon-Based Materials, Small, 2010, vol. 6, No. 6, 711-723.

Li, D. et al., Processable aqueous dispersions of graphene nanosheets, Nature Nanotech., 2008, vol. 3, 101-105.

Tung, V. C. et al., High-throughput solution processing of large-scale graphene, Nature Nanotech., 2009, vol. 4, 25-29.

Luo, J. Y. et al., Graphene Oxide Nanocolloids, J. Am. Chem. Soc., 2010, vol. 132, 17667-17669.

Hamilton, C. E. et al., High-Yield Organic Dispersions of Unfunctionalized Graphene, Nano Lett., 2009, vol. 9, No. 10, 3460-3462.

Wen, X. et al., Crumpled and Collapsed Conformations in Graphite Oxide Membranes, Nature, 1992, vol. 355, 426-428.

Spector, M. S. et al., Conformations of a Tethered Membrane—Crumpling in Graphitic Oxide? Phys. Rev. Lett., 1994, vol. 73, No. 21, 2867-2870.

Cote, L. J. et al., Tunable assembly of graphene oxide surfactant sheets: wrinkles, overlaps and impacts on thin film properties, Soft Matter, 2010, vol. 6, 6096-6101.

Schniepp, H. C. et al., Functionalized single graphene sheets derived from splitting graphite oxide, J. Phys. Chem. B, 2006, vol. 110, 8535-8539.

Stankovich, S. et al., Graphene-based composite materials, Nature, 2006, vol. 442, 282-286.

Kim, J. et al., Visualizing Graphene Based Sheets by Fluorescence Quenching Microscopy, J. Am. Chem. Soc., 2010, vol. 132, 260-267.

Jang, H. D. et al., Co-Assembly of Nanoparticles in Evaporating Aerosol Droplets: Preparation of Nanoporous Pt/TiO2 Composite Particles, Aerosol Sci. Technol., 2010, vol. 44, 1140-1145.

Deegan, R. D. et al., Capillary flow as the cause of ring stains from dried liquid drops, Nature, 1997, vol. 389, 827-829.

Kim, F. et al., Self-Propagating Domino-like Reactions in Oxidized Graphite, Adv. Funct. Mater., vol. 20, 2867-2873.

Jung, I. et al., Reduction Kinetics of Graphene Oxide Determined by Electrical Transport Measurements and Temperature Programmed Desorption, J. Phys. Chem. C, 2009, vol. 113, 18480-18486.

Zhu, Y. W. et al., Microwave assisted exfoliation and reduction of graphite oxide for ultracapacitors, Carbon, 2010, vol. 48, 2118-2122.

Ajayan, P. M. et al, Smallest Carbon Nanotube, Nature, 1992, vol. 358, 23-23.

Segal, M., Selling graphene by the ton, Nature Nanotech., 2009, vol. 4, 611-613.

Kou, R. et al., Stabilization of Electrocatalytic Metal Nanoparticles at Metal-Metal Oxide-Graphene Triple Junction Points, J. Am. Chem. Soc., 2011, vol. 133, 2541-2547.

Stoller, M. D. et al., Graphene-Based Ultracapacitors, Nano Lett., 2008, vol. 8, No. 10, 3498-3502.

Vivekchand, S. R. C.et al., Graphene-based electrochemical supercapacitors, J. Chem. Sci., 2008, vol. 120, No. 1, 9-13.

Liu, C. et al., Graphene-Based Supercapacitor with an Ultrahigh Energy Density, Nano Lett., 2010, vol. 10, 4863-4868.

Hummers, W. S. et al., Preparation of Graphitic Oxide, J. Am. Chem. Soc., 1958, vol. 80, 1339-1339.

Zhang, F. et al., Effects of anolyte recirculation rates and catholytes on electricity generation in a litre-scale upflow microbial fuel cell, Energ. & Environ. Sci., 2010, vol. 3, 1347-1352.

Hee Dong Jang et al., Synthesis of Graphene by Aerosol Assisted Self Assembly, American Association for Aerosol Research, AAAR 30th Annual Conference, 2011, Abstract only.

Xiaofei Ma et al., Crumpled Nanopaper from Graphene Oxide, Nano Letters, 2011, vol. 12, 486-489.

* cited by examiner

S110: forming a graphene dispersion solution with graphene-based material sheets S120: forming aerosol droplets from the graphene dispersion solution S130: forming crumpled particles from the aerosol droplets

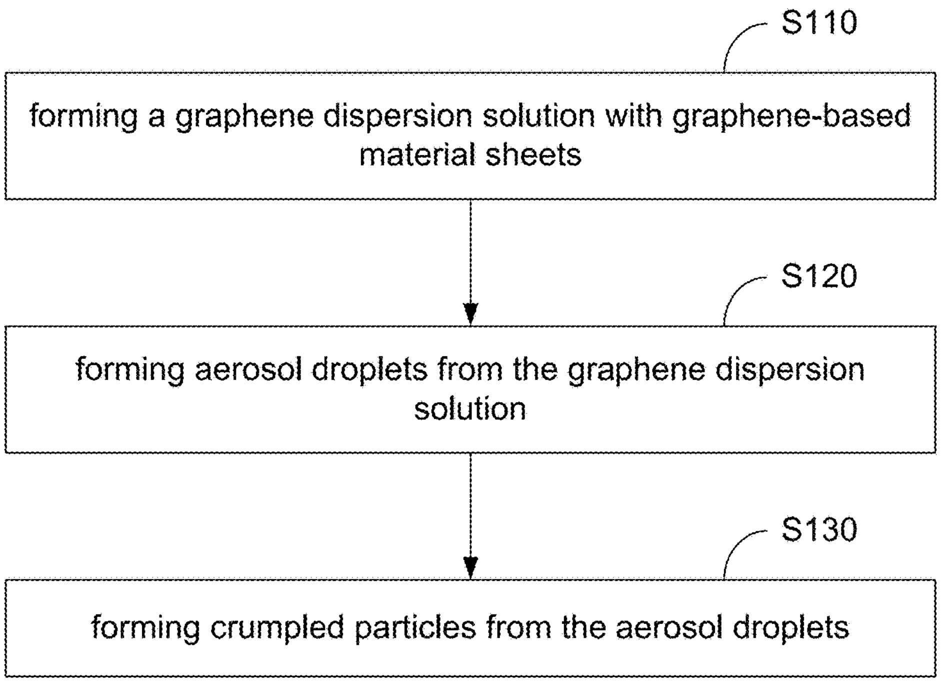

FIG. 1A

S132: passing the aerosol droplets through a pre-heated channel at a predetermined temperature by a carrier gas S134: drying the aerosol droplets to concentrate and compress the aerosol droplets to the crumpled particles

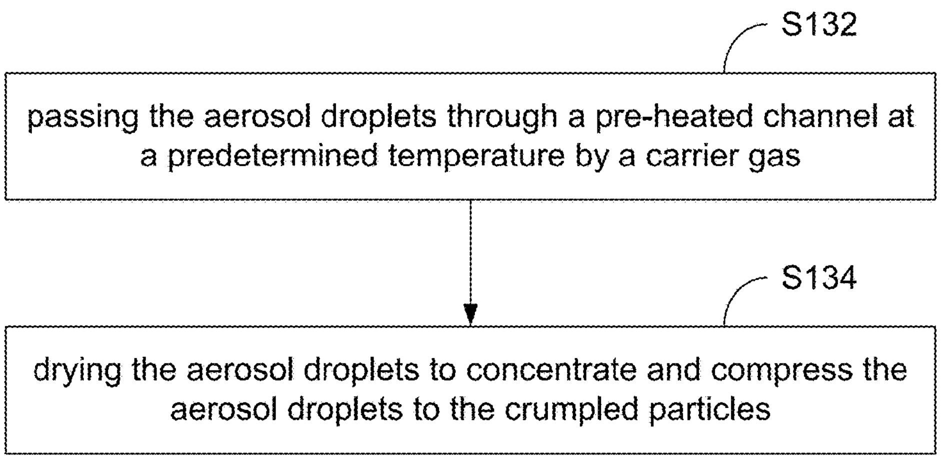

FIG. 1B

CRUMPLED PARTICLES, METHODS OF SYNTHESIZING SAME AND APPLICATIONS USING SAME

CROSS-REFERENCE TO RELATED PATENT APPLICATION

This application claims priority to and the benefit of, pursuant to 35 U.S.C. § 119(e), U.S. provisional patent application Ser. No. 61/503,149, filed Jun. 30, 2011, entitled "COMPRESSION- AND AGGREGATION-RESISTANT PARTICLES OF CRUMPLED SOFT SHEETS AND METHODS OF SYNTHESIZING SAME," by Jiaxing Huang, Hee Dong Jong and Jiayan Luo, the contents of which are incorporated herein in its entireties by reference.

Some references, which may include patents, patent applications and various publications, are cited and discussed in the description of this invention and in Appendix A. The citation and/or discussion of such references is provided merely to clarify the description of the present invention and is not an admission that any such reference is "prior art" to the invention described herein. All references cited and discussed in the description of this invention and in Appendix A are incorporated herein by reference in their entireties and to the same extent as if each reference was individually incorporated by reference. In terms of notation, hereinafter, "[n]" represents the nth reference cited in the reference list. For example, [14] represents the 14th reference cited in the reference list, namely, Cote, L. J., Kim, J., Zhang, Z., Sun, C. & Huang, J. X. Tunable assembly of graphene oxide surfactant sheets: wrinkles, overlaps and impacts on thin film properties. *Soft Matter* 6, 6096-6101, (2010).

FIELD OF THE INVENTION

The present invention relates generally to nanostructures, and more particularly to compression- and aggregation-resistant particles of crumpled soft sheets, methods of synthesizing the same, and applications using the same.

BACKGROUND OF THE INVENTION

Graphene is an allotrope of carbon, which has the structure of one-atom-thick planar sheets of sp2-bonded carbon atoms that are densely packed in a honeycomb crystal lattice. Experiments have established the graphene-based material as one of the thinnest and strongest materials ever used in nano-technology.

A major problem in the scaled up production of graphene-based material sheets is the tendency to aggregate due to strong van der Waals attraction. Restacking of graphene sheets not only reduces their solution processability, but also compromises their properties such as accessible surface area. Further, since materials typically experience some form of compressive stresses during manufacturing and handling such as drying and pelletizing, the aggregation state of graphene sheets tend to be highly dependent on their processing history. Providing aggregation-resistant graphene-based material sheets will help to standardize the material and their performance for large scale applications.

A number of strategies for preventing aggregation of materials in dispersion solutions have been developed [8-11]. However, once the dispersion solutions are dried, making the neat graphene product re-dispersible is challenging.

Therefore, a heretofore unaddressed need exists in the art to address the aforementioned deficiencies and inadequacies.

SUMMARY OF THE INVENTION

In one aspect of the present invention, a method of for synthesizing compression- and aggregation-resistant particles includes forming a graphene dispersion solution with micron-sized graphene-based material sheets, nebulizing the graphene dispersion solution to form aerosol droplets, passing the aerosol droplets through a horizontal tube furnace pre-heated at a predetermined temperature by a carrier gas, and drying the aerosol droplets to concentrate and compress the micron-sized graphene-based material sheets into crumpled particles of sub-micron scale.

The method may further include collecting the crumpled particles at an exhaust of the tube furnace. In one embodiment, the crumpled particles are collected by a filter.

In one embodiment, the crumpled particles have fractal-dimensional crumpled ball structures.

In one embodiment, each crumpled particle is formed by one of the aerosol droplets.

In one embodiment, the crumpled particles have π-π stacked ridges and strain-hardening properties so that they are stable against aggregation in solution or solid state. The crumpled particles are substantially aggregation-resistant in solution or solid state, and remain largely intact and dispersible after chemical treatments, wet processing, annealing and even pelletizing at high pressure. In one embodiment, when pelletized, the crumpled particles form a piece of isotropic, black solid with rough microstructures at both the surface and cross section.

In one embodiment, the crumpled particles can be dispersed in many solvents regardless of their density or polarity without using surfactant due to minimized inter-particle Van der Waals attraction. The solvents include but not limited to water, methanol, isopropanol, acetone, chloroform, tetrahydrofuran, toluene, cyclohexane, dichlorobenzene and ethylene glycol.

In one embodiment, the graphene dispersion solution is nebulized with an ultrasonic atomizer.

In one embodiment, the predetermined temperature is in a range of about 20-2000° C.

In one embodiment, the carrier gas flows at a predetermined speed.

In one embodiment, the carrier gas is $N_2$.

In one embodiment, the micron-sized graphene-based material sheets include graphene oxide (GO) sheets. The step of forming the graphene dispersion solution in one embodiment includes dispersing GO powders in a liquid to form a mixture, filtrating the mixture to collect the GO powders, heating the GO powders at a $N_2$ atmosphere to a first temperature at a predetermined heating rate, and holding the GO powders at the first temperature for a first period of time, disposing and heating the GO powders in a hot tube furnace at a second temperature to trigger explosive exfoliation for a second period of time, irradiating the GO powders in a microwave oven, fluxing the GO powders in hydrazine at a third temperature for a third period of time to dry the GO powders, and pelletizing the dried GO powders in a die to form the GO dispersion solution. In one embodiment, the first temperature is in a range of about 100-800° C., and the first period of time is in a range of about 30 min to 5 hrs. In one embodiment, the predetermined heating rate is in a range of about 1-10° C./min. The second temperature is in a range of about 100-800° C., and the second period of time is in a range of about 1-15 min. The third temperature is in a range of about 10-200° C., and the third period of time is in a range of about 1-20 hrs.

Another aspect of the invention discloses a method synthesizing crumpled particles, which includes forming a graphene dispersion solution with graphene-based material sheets, forming aerosol droplets from the graphene dispersion solution, and forming crumpled particles from the aerosol droplets.

In one embodiment, the step of forming the crumpled particles includes: passing the aerosol droplets through a pre-heated channel at a predetermined temperature by a carrier gas, and drying the aerosol droplets to concentrate and compress the aerosol droplets to the crumpled particles. In one embodiment, the step of forming the crumpled particles further includes: collecting the crumpled particles at an exhaust of the pre-heated channel. In a further embodiment, the crumpled particles are collected by a filter. In one embodiment, the channel is a horizontal tube furnace.

In one embodiment, the aerosol droplets are formed by nebulizing the graphene dispersion solution. In one embodiment, the graphene dispersion solution is nebulized with an ultrasonic atomizer.

In one embodiment, the graphene-based material sheets are micron-sized. Each crumpled particle has a particle dimension from smaller than 1 micrometer to a few micrometers.

In one embodiment, each crumpled particle is formed by one of the aerosol droplets.

In one embodiment, the crumpled particles have fractal-dimensional crumpled ball structures.

In one embodiment, the crumpled particles have π-π stacked ridges and strain-hardening properties so that they are stable against aggregation in solution or solid state. The crumpled particles are substantially aggregation-resistant in solution or solid state, and remain largely intact and dispersible after chemical treatments, wet processing, annealing and even pelletizing at high pressure. In one embodiment, when pelletized, the crumpled particles form a piece of isotropic, black solid with rough microstructures at both the surface and cross section.

In one embodiment, the predetermined temperature is in a range of about 20-2000° C.

In one embodiment, the graphene dispersion solution is nebulized with an ultrasonic atomizer.

In one embodiment, the carrier gas flows at a predetermined speed.

The carrier gas can be $N_2$, many other gases or even air.

Yet another aspect of the invention relates to crumpled particles formed with the above methods.

In one aspect of the present invention, an article comprises the crumpled particles synthesized according to the above method. The aspect of the present invention provides applications that rely on the high surface area and processability of graphene-based materials.

The article includes, but not limited to, a microbial fuel cell (MFC), a battery, a capacitor, catalysis, polymer composite, or the like.

For example, in one embodiment, the MFC includes an anode chamber having an anode with at least a part of the anode formed by the above crumpled, a cathode chamber having a cathode, a cation exchange membrane disposed between the anode chamber and the cathode chamber, and a plurality of electricigenic microbes disposed on the anode to increase a power density of the microbial fuel cell.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment.

FIG. 1A shows a flowchart of synthesizing compression- and aggregation-resistant particles according to one embodiment of the present invention.

FIG. 1B shows a flowchart of the detailed steps of forming the crumpled particles from the aerosol droplets according to one embodiment of the present invention.

DETAILED DESCRIPTION OF THE INVENTION

Figure 1C:
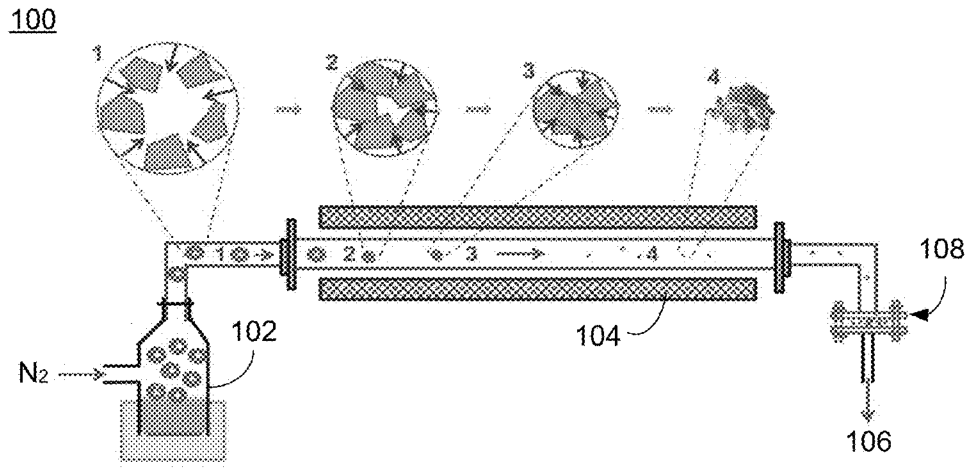
FIG. 1C shows schematically an apparatus performing a method of synthesizing compression- and aggregation-resistant particles according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Additionally, some terms used in this specification are more specifically defined below.

Definitions

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to various embodiments given in this specification.

Unless otherwise defined, all technical and scientific terms used herein have the same meaning as commonly understood by one of ordinary skill in the art to which this invention pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

As used herein, if any, the term "scanning electron microscope" or its abbreviation "SEM" refers to a type of electron microscope that images the sample surface by scanning it with a high-energy beam of electrons in a raster scan pattern. The electrons interact with the atoms that make up the sample producing signals that contain information about the sample's surface topography, composition and other properties such as electrical conductivity.

As used herein, if any, the term "transmission electron microscopy" or its abbreviation "TEM" refers to a microscopy technique whereby a beam of electrons is transmitted through an ultra thin specimen, interacting with the specimen as it passes through. An image is formed from the interaction of the electrons transmitted through the specimen; the image is magnified and focused onto an imaging device, such as a fluorescent screen, on a layer of photographic film, or to be detected by a sensor such as a CCD camera.

As used herein, if any, the term "X-ray photoelectron spectroscopy" or its abbreviation "XPS" refers to a method used to determine the composition of the top few nanometers of a surface. It involves bombarding the surface with x-rays above a threshold frequency which leads to generation of photoelectrons from the core-level of the atoms, leaving behind holes. Based on conservation of energy, the kinetic energy can be given by $\frac{1}{2} m_e \upsilon^2 = h\upsilon - E_B - \varphi$, where $m_e$ is the mass of the electron, v is the electron velocity after ejection, h is the Plank's constant, u is the frequency of incident x-ray, $E_B$ is the electron binding energy and φ is the work function of the material being studied. The binding energy can be plotted versus photoelectrons' intensity, and the peaks observed are characteristic of the elements.

As used herein, the terms "micron-sized", "micron-scaled", "microscopic", the "micron-" prefix, and the like generally refers to elements or articles having widths or diameters in the order of micrometers ($10^{-6}$ meters), and the terms "sub-micron sized", "sub-micron scaled", "sub-microscopic", the "sub-micro-" prefix, and the like generally refers to elements or articles having widths or diameters shorter than 1 micrometer (1 μm). In all embodiments, specified widths can be smallest width (i.e. a width as specified where, at that location, the article can have a larger width in a different dimension), or largest width (i.e. where, at that location, the article's width is no wider than as specified, but can have a length that is greater).

As used herein, a "nanostructure" refers to an object of intermediate size between molecular and microscopic (micrometer-sized) structures. In describing nanostructures, the sizes of the nanostructures refer to the number of dimensions on the nanoscale. For example, nanotextured surfaces have one dimension on the nanoscale, i.e., only the thickness of the surface of an object is between 0.1 and 1000 nm. Sphere-like nanoparticles have fractal-dimensions on the nanoscale, i.e., the particle is between 0.1 and 1000 nm in each spatial dimension. A list of nanostructures includes, but not limited to, nanoparticle, nanocomposite, quantum dot, nanofilm, nanoshell, nanofiber, nanoring, nanorod, nanowire, nanotube, and so on.

As used herein, a microbial fuel cell or its abbreviation "MFC" refers to a bio-electrochemical system that drives a current by mimicking bacterial interactions found in nature. More specifically, a MFC is a device that converts chemical energy to electrical energy by the catalytic reaction of microorganisms.

Overview of the Invention

This invention discloses, among other things, compression- and aggregation-resistant particles of crumpled soft sheets and methods of synthesizing the same. Unlike flat sheets, crumpled paper balls [1-4] have both high free volume and high compressive strength, and can tightly pack without significantly reducing the area of accessible surface. Such properties would be highly desirable for graphene-based material sheets [5-7], since they tend to aggregate in solution and restack in solid state, making their properties highly dependent on the material processing history. According to the invention, the crumpled graphene balls are synthesized by capillary compression in rapidly evaporating aerosol droplets.

In one aspect of the present invention, a method of for synthesizing compression- and aggregation-resistant crumpled particles includes forming a graphene dispersion solution with micron-sized graphene-based material sheets, nebulizing the graphene dispersion solution to form aerosol droplets, passing the aerosol droplets through a horizontal tube furnace pre-heated at a predetermined temperature by a carrier gas, and drying the aerosol droplets to concentrate and compress the micron-sized graphene-based material sheets into crumpled particles of sub-micron scale.

In another aspect, a method synthesizing compression- and aggregation-resistant crumpled particles includes forming a graphene dispersion solution with graphene-based material sheets, forming aerosol droplets from the graphene dispersion solution, and forming crumpled particles from the aerosol droplets. The step of forming the crumpled particles includes passing the aerosol droplets through a pre-heated channel at a predetermined temperature by a carrier gas, and drying the aerosol droplets to concentrate and compress the aerosol droplets to the crumpled particles. In one embodiment, the channel is a horizontal tube furnace.

In one embodiment, the aerosol droplets are formed by nebulizing the graphene dispersion solution, where the graphene dispersion solution is nebulized with an ultrasonic atomizer. In one embodiment, each crumpled particle has a particle dimension smaller than 1 micrometer. In one embodiment, each crumpled particle is formed by one of the aerosol droplets.

For crumpled particles, such as the crumpled paper balls, the dimensional transition from flat sheets to fractal-dimensional crumpled particles, if achieved, could render them excellent compression- and aggregation-resistant properties.

In one embodiment, the graphene-based material sheets are micron-sized, and the micron-sized graphene-based material sheets are GO. GO is a most promising precursor for bulk production of chemically modified graphene (a.k.a. reduced GO, r-GO) [5-7]. Crumpling of GO sheets in poor solvents was once proposed [12], but its success has remained uncertain [13]. On the other hand, wrinkles and folds are commonly observed for GO and r-GO samples that have experienced some form of mechanical stress during solution processing [14], explosive thermal exfoliation [15] or compositing with polymer [16]. In an earlier work, using fluorescence quenching microscopy, the inventors directly observed that GO sheets in a drying droplet can be folded into a highly crumpled structure by evaporation induced capillary flow [17]. Therefore, if the evaporating droplets can be made free-standing, the soft GO sheets will be isotropically compressed to form a near-spherical particle just like a crumpled paper ball. This has now been achieved by an aerosol assisted capillary compression process.

According to the present invention, the method is utilized for synthesis of compression- and aggregation-resistant crumpled graphene-based material balls by capillary compression in rapidly evaporating aerosol droplets. The obtained crumpled particles are remarkably aggregation-resistant in either solution or solid state, and remain largely intact and dispersible after chemical treatments, wet processing, annealing and even pelletizing at high pressure. Therefore, crumpled particles could help to standardize graphene-based materials by delivering stable properties such as high surface area and solution processability regardless of material processing history. This should benefit their large scale applications, for example, as electrodes in energy storage or conversion devices.

In one aspect, the invention relates to applications that rely on the high surface area and processability of graphene-based materials. For example, an article or device comprising the crumpled particles synthesized according to the above method. The article includes, but not limited to, a microbial fuel cell (MFC), a battery, a capacitor, catalysis, polymer composite, or the like.

For example, in one embodiment, the MFC include an anode chamber having an anode with at least a part of the anode formed by crumpled particles as disclosed above, a cathode chamber having a cathode, a cation exchange membrane disposed between the anode chamber and the cathode chamber, and a plurality of electricigenic microbes disposed on the anode to increase a power density of the microbial fuel cell.

In another aspect, the invention relates to crumpled particles made with any sheet-like materials, the method of making them, and applications using these crumpled particles made from sheet-like materials.

These and other aspects of the present invention are more specifically described below.

Implementations and Examples of the Invention

Without intent to limit the scope of the invention, exemplary methods and their related results according to the embodiments of the present invention are given below in conjunction with the accompanying drawings in FIGS. 1-10C. Note that certain theories are proposed and disclosed herein; however, in no way they, whether they are right or wrong, should limit the scope of the invention so long as the invention is practiced according to the invention without regard for any particular theory or scheme of action.

Referring to FIG. 1A, a flowchart of synthesizing crumpled particles is shown according to one embodiment of the present invention. The method includes forming a graphene dispersion solution with graphene-based material sheets (step S110), forming aerosol droplets from the graphene dispersion solution (step S120), and forming crumpled particles from the aerosol droplets (step S130).

The aerosol droplets are formed by, but not limited to, nebulizing the graphene dispersion solution. In one embodiment, the graphene dispersion solution is nebulized with an ultrasonic atomizer, or other nebulizing devices.

FIG. 1B shows a flowchart of forming the crumpled particles from the aerosol droplets according to one embodiment of the present invention. In this embodiment, the crumpled particles are formed by passing the aerosol droplets through a pre-heated channel at a predetermined temperature by a carrier gas (step S132), and drying the aerosol droplets to concentrate and compress the aerosol droplets to the crumpled particles (step S134).

In one embodiment, the graphene-based material sheets are micron-sized. The crumpled particles are sub-micron scaled. In other words, each crumpled particle has a particle dimension smaller than 1 micrometer. In one embodiment, the channel is a horizontal tube furnace.

Referring to FIG. 1C, an apparatus for synthesizing compression- and aggregation-resistant crumpled particles is schematically shown according to one embodiment of the present invention, which is corresponding to an experimental setup [18] for synthesizing the crumpled particles. The apparatus 100 includes an ultrasonic atomizer 102, a horizontal tube furnace 104 connected to the ultrasonic atomizer 102, an exhaust 106 of the horizontal tube furnace 104, and a filter 108 at the exhaust 106. There are 4 stages for the horizontal tube furnace 104, including stage 1 immediately before the entrance of the horizontal tube furnace 104, stage 2 inside the horizontal tube furnace 104 near the entrance, stage 3 at the middle part of the horizontal tube furnace 104, and stage 4 near the exit of the horizontal tube furnace 104.

After a graphene dispersion solution is formed with graphene-based material sheets, the solution is provided in the ultrasonic atomizer 102 to be nebulized to form the aerosol droplets. Then, a carrier gas is provided to the ultrasonic atomizer 102 for transferring or flying the aerosol droplets toward the horizontal tube furnace 104. In one embodiment, the carrier gas flows at a predetermined speed. In one embodiment, the carrier gas is $N_2$, as shown in FIG. 1C. In some embodiments, the carrier gas can be inert gases or other low-responsive gases.

Then, the carrier gas brings the aerosol droplets to pass through the pre-heated channel of the horizontal tube furnace 104 at a predetermined temperature. In one embodiment, the predetermined temperature is in a range of about 20-2000° C. In one embodiment, the predetermined temperature is about 800° C.

Crumpled particles can be obtained with the furnace temperature set as low as 10° C., which is below the typical thermal reduction temperature of GO [20-21], suggesting that capillary compression rather than thermal annealing is responsible for deforming the sheets.

In passing the horizontal tube furnace 104, rapid evaporation causes shrinkage of the aerosol droplets, first concentrating the graphene-based material sheets and subsequently compressing them into crumpled particles of sub-micron scale. Thus, the crumpled particles can be collected at the exhaust 106 of the tube furnace by the filter 108.

The crumpled particles have fractal-dimensional crumpled ball structures. In one embodiment, each crumpled particle is formed by one of the aerosol droplets. Among other advantages, the crumpled particles have π-π stacked ridges and strain-hardening properties so that they are stable against aggregation in solution or solid state. The crumpled particles are substantially aggregation-resistant in solution or solid state, and remain largely intact and dispersible after chemical treatments, wet processing, annealing and even pelletizing at high pressure. When pelletized, the crumpled particles form a piece of isotropic, black solid with rough microstructures at both the surface and cross section.

In one embodiment, the micron-sized graphene-based material sheets are GO. The step of forming the graphene dispersion solution comprises: dispersing GO powders in a liquid to form a mixture; filtrating the mixture to collect the GO powders; heating the GO powders at a N2 atmosphere to a first temperature at a predetermined heating rate, and holding the GO powders at the first temperature for a first period of time; disposing and heating the GO powders in a hot tube furnace at a second temperature to trigger explosive exfoliation for a second period of time; irradiating the GO powders in a microwave oven; fluxing the GO powders in hydrazine at a third temperature for a third period of time to dry the GO powders; and pelletizing the dried GO powders in a die to form the GO dispersion solution. In one embodiment, the first temperature is in a range of about 100-800° C., and the first period of time is in a range of about 30 min to 5 hrs. In one embodiment, the predetermined heating rate is in a range of about 1-10° C./min. The second temperature is in a range of about 100-800° C., and the second period of time is in a range of about 1-15 min. The third temperature is in a range of about 10-200° C., and the third period of time is in a range of about 1-20 hrs.

The crumpled particles according to the present invention can be used in a variety of applications. For example, the crumpled particles may be utilized as electrode materials of fuel cells, such as a microbial fuel cell that includes an anode chamber having an anode, a cathode chamber having a cathode, a cation exchange membrane disposed between the anode chamber and the cathode chamber, and a plurality of electricigenic microbes disposed on the anode to increase a power density of the microbial fuel cell, where at least a part of the anode is formed by the crumpled particles formed above.

An example of the method is performed with GO as the graphene-based material sheets. GO was prepared by a modified Hummers' method [29] as reported elsewhere. [20] GO dispersion solutions with various concentrations were nebulized by an ultrasonic atomizer to form aerosol droplets, which were carried by $N_2$ gas at 1 l/min to fly through a horizontal tube furnace (tube diameter=1 inch) pre-heated at a desired temperature. A Teflon filter was placed at the exhaust [18] to collect the crumpled particles.

Solution processing was typically done by first dispersing the GO powder samples in a liquid, such as water or methanol, by gentle shaking or sonication to form a mixture, and then filtrating the mixture to collect the GO powders. The GO particles can also disperse in many other solvents known to be poor for dispersing GO or r-GO such as acetone, toluene and cyclohexane. Then, slow heating of the GO powders was done in a $N_2$ atmosphere by first heating the GO powder samples from room temperature to 400° C. at a rate of 3° C./min, and holding them at 400° C. for another 2 hours. Thermal shock [15] was done by rapidly inserting the GO powder samples into a hot tube furnace at 400° C. to trigger the explosive exfoliation, and heating them for another 5 minutes. Microwave reduction [22] of the GO powders was done by irradiating the samples in a commercial microwave oven at 1250 W for 1 minute. Hydrazine reduction [9] was done by fluxing GO in hydrazine at 80° C. for 12 hours. Mechanical compression was done by pelletizing the dried GO powder samples in a die with diameter of either 3 mm or 20 mm.

For characterization of the crumpled particles, SEM images were taken on a FEI NOVA 600 SEM microscopes. STEM study was conducted using a Tecnai F20ST microscope (FEI Company, USA) operated at an acceleration voltage of 200 kV. To generate the (002) contour map, 540 sets of CBED pattern were collected in STEM mode from an area of 1000×600 $nm^2$ with pitch of 33 nm. The probe size is about 4 nm, and the exposure time for each diffraction pattern is 5 sec. The specific surface areas were measured using the Brumauer-Emmett-Teller (BET) method based on the nitrogen adsorption-desorption isotherms measured at 77 K on a Micromeritics TriStar II 3020 sorption analyzer. Nanoindentation experiments were conducted on a TI950 Triboindenter (Hysitron). A Berkovich diamond nanoindenter with an included angle of 142.35° and radius of 150 nm was used to locate and image the crumpled particles, and perform the indentation test.

The graphene dispersion solution formed with the micron-sized GO sheets was nebulized at the ultrasonic atomizer 102 to generate aerosol droplets and flown through the tube furnace 104, which was pre-heated at 800° C., by $N_2$ as the carrier gas. Rapid evaporation causes shrinkage of the droplets, first concentrating the GO sheets and subsequently compressing them into the crumpled particles of sub-micron scale. The GO sheets were also thermally reduced to chemically modified graphene (a.k.a. r-GO) as indicated by the color change from brown to black and confirmed by X-ray photoelectron spectroscopy (XPS).

Figures 2A, 2B, 2C, 2D:
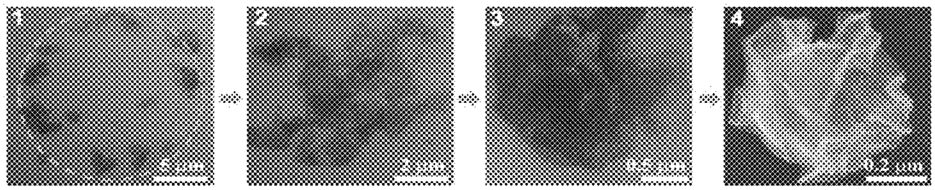
FIG. 2A shows a SEM image of samples of aerosol droplets collected at stage 1 before entering the horizontal tube furnace of FIG. 1C according to one embodiment of the present invention, where the micron-sized graphene-based material sheets in the aerosol droplets are distributed in a coffee-ring pattern.
FIG. 2B shows a SEM image of samples of aerosol droplets collected at stage 2 of the horizontal tube furnace of FIG. 1C according to one embodiment of the present invention, where the micron-sized graphene-based material sheets in the aerosol droplets are distributed in clustered and tiled patterns.
FIG. 2C shows a SEM image of samples of aerosol droplets collected at stage 3 of the horizontal tube furnace of FIG. 1C according to one embodiment of the present invention, where the micron-sized graphene-based material sheets in the aerosol droplets are aggregated sheets with extensive wrinkles.
FIG. 2D shows a SEM image of a sample of an aerosol droplet collected at stage 4 of the horizontal tube furnace of FIG. 1C according to one embodiment of the present invention, where the aerosol droplets are evaporated to form the crumpled particles.

FIG. 2A shows a SEM image of samples of aerosol droplets collected at stage 1 before entering the horizontal tube furnace shown in FIG. 1C, and FIG. 2B-2D show SEM images of samples of aerosol droplets collected at stages 2-4 of the horizontal tube furnace shown in FIG. 1C. As shown in FIG. 2A, the micron-sized graphene-based material sheets in the aerosol droplets are distributed in a coffee-ring pattern [19] at stage 1. At stage 2, the micron-sized graphene-based material sheets in the aerosol droplets are distributed in clustered and tiled patterns, as shown in FIG. 2B. Then, at stage 3, the micron-sized graphene-based material sheets in the aerosol droplets are concentrated to become aggregated sheets with extensive wrinkles, as shown in FIG. 2C. Then, at stage 4, the aerosol droplets are evaporated and the micron-sized graphene-based material sheets are compressed to form the crumpled particles, as shown in FIG. 2D. The crumpled particle shown in FIG. 2D is a fractal-dimensional, crumpled ball-like structure with many ridges and vertices. In other words, the crumpled particles have fractal-dimensional crumpled ball structures.

The morphological evolution, as shown in FIGS. 2A-2D, suggests that each aerosol droplet produces one crumpled particles. In other words, each crumpled particle is formed by one of the aerosol droplets.

Figure 3A:
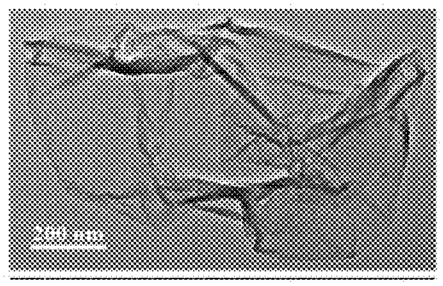
FIG. 3A shows a TEM image of an crumpled particle according to one embodiment of the present invention.
Figure 3C:
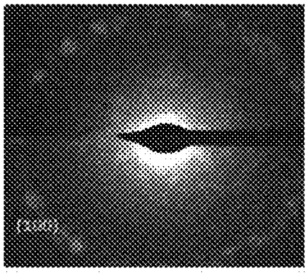
FIG. 3C shows electron diffraction patterns of a flat region on the crumpled particle as shown in FIG. 3A.
Figure 3B:
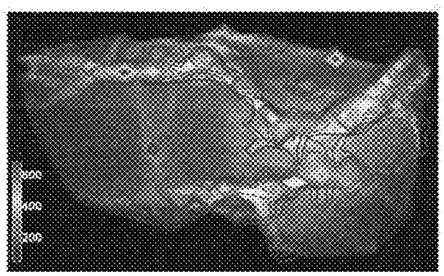
FIG. 3B shows a XPS image of the crumpled particle as shown in FIG. 3A.
Figure 3D:
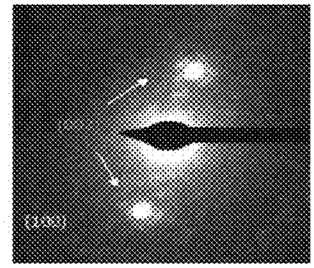
FIG. 3D shows electron diffraction patterns of a ridge region on the crumpled particle as shown in FIG. 3A.

Scanning transmission electron microscopy (STEM) and localized electron diffraction were performed to investigate the structure of ridges in crumpled r-GO. FIG. 3A shows a TEM image of an crumpled particle according to one embodiment of the present invention. FIG. 3B shows a XPS image of the crumpled particle as shown in FIG. 3A. FIG. 3C shows electron diffraction patterns of a flat region on the crumpled particle as shown in FIG. 3A. FIG. 3D shows electron diffraction patterns of a ridge region on the crumpled particle as shown in FIG. 3A. A relatively flat particle was chosen over the more spherical crumples to avoid overlaying ridges in the projected STEM view. The convergent beam electron diffraction (CBED) patterns were then collected from a flat region (FIG. 3C) and a ridge (FIG. 3D), respectively. As shown in FIGS. 3C and 3D, the graphene-based material sheets are re-stacked at the ridges, yielding strong graphite (002) diffraction. The pattern from the flat region contains a few sets of graphene (100) diffraction spots. The speckles at low-q regions are from amorphous carbon membrane used to support the sample. However, as shown in FIG. 3D, the pattern from the ridge shows strong graphite (002) diffraction spots corresponding to a d-spacing of around 3.5 Å, which is slightly larger than the standard 3.4 Å spacing in graphite crystal. This is attributed to less perfect stacking of r-GO sheets that still have residual surface functional groups [5-7]. Next, an electron diffraction contour map was constructed by scanning the electron beam across the entire area of the crumpled particle while collecting intensity from the (002) diffraction. The electron atomic scattering factor had already been subtracted to remove the contribution of thickness/mass from the (002) scattering intensity. Therefore, the contour image directly maps out the distribution of tightly packed graphene domains in the crumpled particle. This is illustrated in FIG. 3B, as shown by the high-angle dark-field image overlapped with the contour map of graphite (002) scattering intensity. When the contour map is overlaid with the high angle dark-field STEM image of the particle, as shown in FIG. 3B, it clearly shows that all the spots giving high (002) scattering intensity are located along the ridges. This suggests that plastic deformation in the crumpled graphene particles is due to strong π-π stacking at the ridges.

Figure 4A:
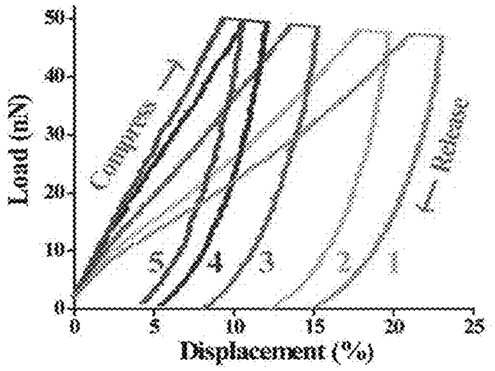
FIG. 4A shows a chart of representative load/displacement curves of 5 cycles of compression and release on a single crumpled GO particle with a nanoindenter according to one embodiment of the present invention.
Figure 4B:
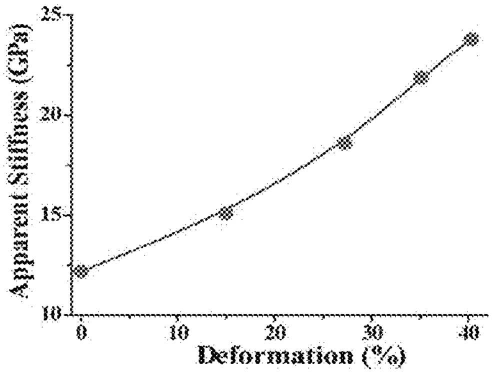
FIG. 4B shows a chart of the apparent stiffness to deformation curve according to one embodiment of the present invention.

FIG. 4A shows a chart of representative load/displacement curves of 5 cycles of compression and release on a single crumpled GO particle with a nanoindenter according to one embodiment of the present invention. FIG. 4B shows a chart of the apparent stiffness to deformation curve according to one embodiment of the present invention.

A striking feature of crumpled paper balls is their increased stiffness and strength upon compression by forming more hard-to-bend ridges [1-2, 4]. This strain-hardening effect is also observed for crumpled graphene balls in nanoindentation experiments. According to the load/displacement curves of a single crumpled graphene particle compressed by a diamond nanoindenter, as shown in FIG. 4A, 5 loading/hold/unloading cycles were performed with the maximal load of 50 nN. The displacement measures percent height reduction of the particle. In each cycle, a large plastic deformation was observed after an initial linear elastic response. As the cycling progressed, the degree of plastic deformation decreased continuously from 15% to less than 5%. In other words, the crumpled particle was plastically deformed and strain hardened.

Meanwhile, the apparent yield strength, marked by the load at the elastic-plastic transition on the loading curves as shown in FIG. 4B, increased after each cycle. According to FIG. 4B, the apparent stiffness of the particle, calculated by dividing the slope of the initial linear segment of the loading curves within 2% displacement by the initial cross-sectional area of the particle, is also increased after each cycle. Overall, the nanoindentation experiments revealed that the crumpled graphene particles are compression-resistant just like paper balls [2] as compressive stress makes them stiffer and harder.

The π-π stacked ridges and strain-hardening properties make the crumpled graphene balls remarkably stable against aggregation not only in solution but also in solid state.

Figure 5A:
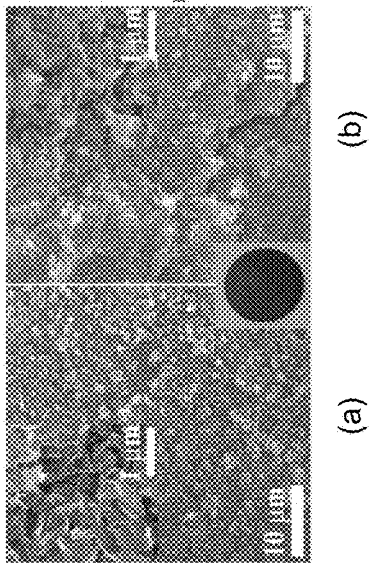
FIG. 5A shows SEM images of compressed pellet of crumpled r-GO particles according to one embodiment of the present invention.
Figure 5B:
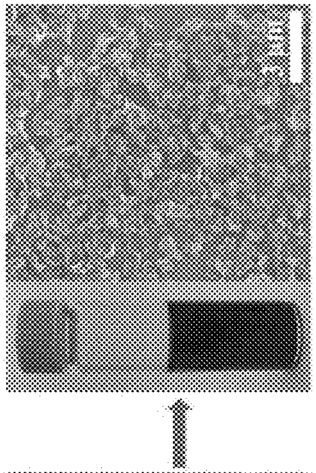
FIG. 5B shows a SEM image of the graphene dispersion solution formed with the crumpled r-GO particles according to one embodiment of the present invention.
Figure 5C:
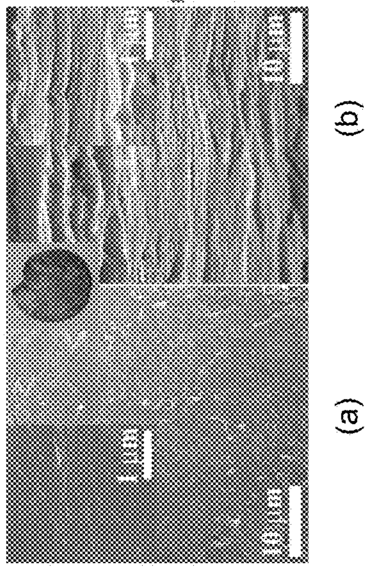
FIG. 5C shows SEM images of anisotropic pellet of flat r-GO particles according to a comparative embodiment.
Figure 5D:
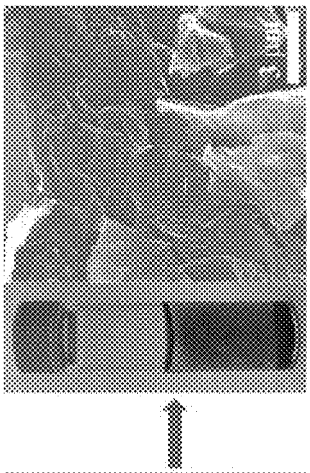
FIG. 5D shows a SEM image of the graphene dispersion solution formed with the flat r-GO particles according to a comparative embodiment.

FIG. 5A shows SEM images of compressed pellet of crumpled r-GO particles according to one embodiment of the present invention, and FIG. 5B shows a SEM image of the graphene dispersion solution formed with the crumpled r-GO particles according to one embodiment of the present invention. In FIG. 5A, the SEM image (a) shows the surface of the crumpled r-GO particles, and the SEM image (b) shows the cross-section of the crumpled r-GO particles. In contrast, FIG. 5C shows SEM images of anisotropic pellet of flat r-GO particles according to a comparative embodiment, and FIG. 5D shows a SEM image of the graphene dispersion solution formed with the flat r-GO particles according to a comparative embodiment. In FIG. 5C, the SEM image (a) shows the surface of the flat r-GO particles, and the SEM image (b) shows the cross-section of the flat r-GO particles.

As shown in FIG. 5A, when pelletized, crumpled graphene balls form a piece of isotropic, black solid with rough microstructures at both the surface and cross-section. In other words, the compressed pellet of crumpled r-GO particles has rough and isotropic morphologies due to their near-spherical, pointy shape. In contrast, FIG. 5C shows that flat r-GO sheets re-stack along the compressing direction, resulting in a highly anisotropic pellet with very smooth surface and lamellar cross-section. As shown in FIG. 5C, sheet-like graphene yields an anisotropic, shinning pellet with very smooth, nearly featureless surface but laminated microstructure at the cross-section.

Further, the pellet of the crumpled particles can be readily dispersed in solvents by gentle hand-shaking after being compressed at 55 MPa and even 2 GPa, as shown in FIG. 5B. The solvents include water, methanol, tetrahydrofuran and even the poor solvents for GO or r-GO such as toluene, acetone and cyclohexane. The SEM image of re-dispersed particles, as shown in FIG. 5B, shows that the crumpled morphology is largely unaffected by the compression. In contrast, the pellet of regular flat r-GO sheets cannot be re-dispersed even after sonication due to extensive irreversible aggregation and stacking, as shown in FIG. 5D.

To compare the effects of processing history on material properties, the re-dispersed samples as shown in FIGS. 5B and 5D were dried and pelletized again at 55 MPa. 4-probe measurements showed that the surface conductivity of the recompressed r-GO sheets decreased by nearly 50%, which can be attributed to misaligned, aggregated graphene flakes after one cycle of dispersion/recompression. As expected, the conductivity of the crumpled r-GO pellet was largely unchanged.

Figure 6A:
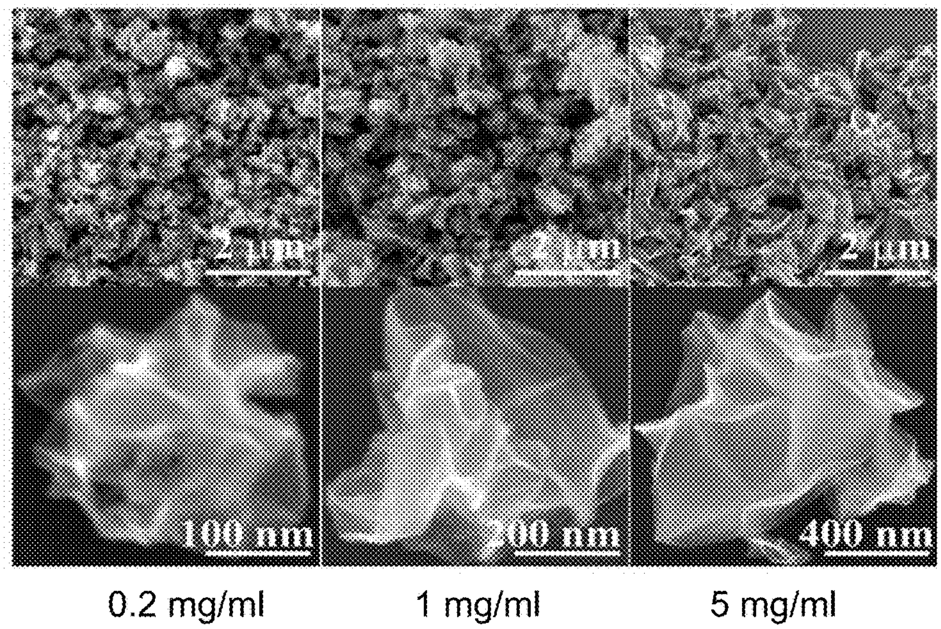
FIG. 6A shows SEM images of the crumpled particles formed with different concentrations of GO in the aerosol droplets (5 mg/ml, 1 mg/ml and 0.2 mg/ml) according to one embodiment of the present invention.
Figure 6B:
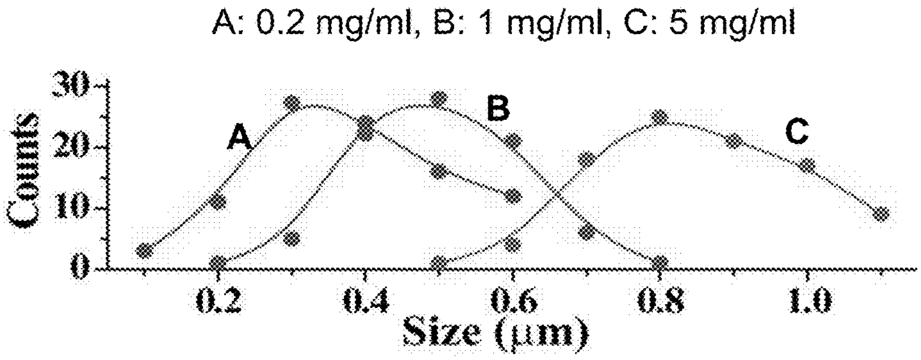
FIG. 6B shows a chart of the size of the crumpled particles formed with different concentrations of GO in the aerosol droplets (5 mg/ml, 1 mg/ml and 0.2 mg/ml) according to one embodiment of the present invention.
Figure 7A:
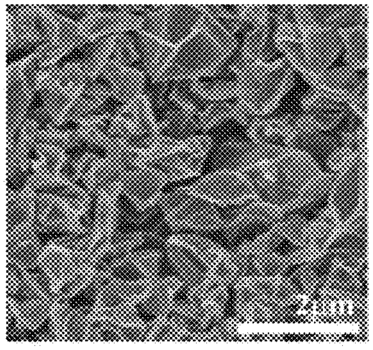
FIG. 7A shows a SEM image of the crumpled r-GO particles according to one embodiment of the present invention, where crumpled morphology of the crumpled particles is retained after solution processing in methanol.
Figure 7B:
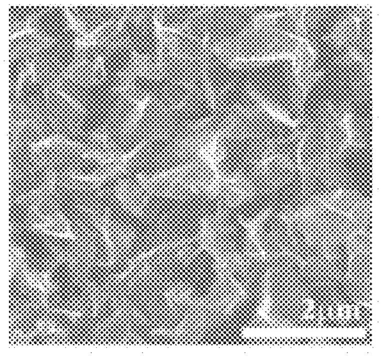
FIG. 7B shows a SEM image of the crumpled r-GO particles according to one embodiment of the present invention, where crumpled morphology of the crumpled particles is retained after a thermal shock at 400° C.
Figure 7C:
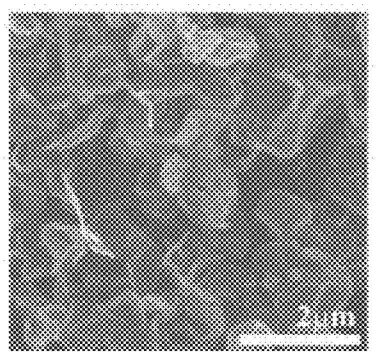
FIG. 7C shows a SEM image of the crumpled r-GO particles according to one embodiment of the present invention, where crumpled morphology of the crumpled particles is retained after microwave reduction.
Figure 7D:
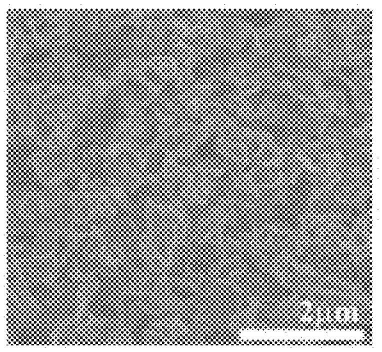
FIG. 7D shows a SEM image of the crumpled r-GO particles according to one embodiment of the present invention, where crumpled morphology of the crumpled particles is retained after hydrazine reduction.

FIG. 6A shows SEM images of the crumpled particles formed with different concentrations of GO in the aerosol droplets (5 mg/ml, 1 mg/ml and 0.2 mg/ml) according to one embodiment of the present invention, and FIG. 6B shows a chart of the size of the crumpled particles formed with different concentrations of GO in the aerosol droplets (5 mg/ml, 1 mg/ml and 0.2 mg/ml) according to one embodiment of the present invention. In FIG. 6A, for each of the concentrations of GO in the aerosol droplets, the crumpled particles formed are shown in a low magnification overview SEM image and a representative high magnification single particle SEM image.

As shown in FIG. 6A, the size of the crumpled particles and the degree of crumpling can be tuned by the concentrations of GO in the aerosol droplets. With higher initial GO concentration, the average size of the crumpled particles became larger, and the degree of crumpling as indicated by the density of ridges and vertices was lower. The average size of the particles decreased from around 800 nm, 500 nm to 250 nm when the GO concentration was reduced from 5 mg/ml, 1 mg/ml to 0.2 mg/ml, respectively, as shown in FIG. 6B. Since the GO sheets at least partially overlapped before crumpling, as shown in FIGS. 2B and 2C, higher GO concentration would result in thicker GO flakes of higher bending modulus, making them stiffer against deformation, thus leading to the less crumpled, larger particles. In principle, it should be possible to produce crumpled particles made of only a single sheet at extremely low GO concentrations, which could show the highest degree of crumpling.

The crumpled morphology is very open but also very robust as it can sustain common material processing conditions.

Referring to FIGS. 7A-7D, SEM images of the crumpled r-GO particles are shown according to one embodiment of the present invention, where crumpled morphology of the crumpled particles is retained after solution processing in methanol, a thermal shock at 400° C., microwave reduction, and hydrazine reduction, respectively. The SEM images in FIGS. 7A-7D show that the crumpled GO particles can survive solution processing, thermal shock [15], microwave heating [22] and hydrazine treatment [5], respectively, without much change in size and shape. In a paper ball, the crumpled structure is stabilized by plastically deformed ridges [1-2, 4] made of kinked paper fibers, which prevent the structure from unfolding. For crumpled graphene-based material particles, the typical thicknesses of the ridges were found to be around tens of nanometers by electron microscopy. Since graphene can curve to form even smaller diameter carbon nanotubes without breaking chemical bonds [23], the irreversible deformation in crumpled graphene balls should have a different mechanism.

Figure 8A:
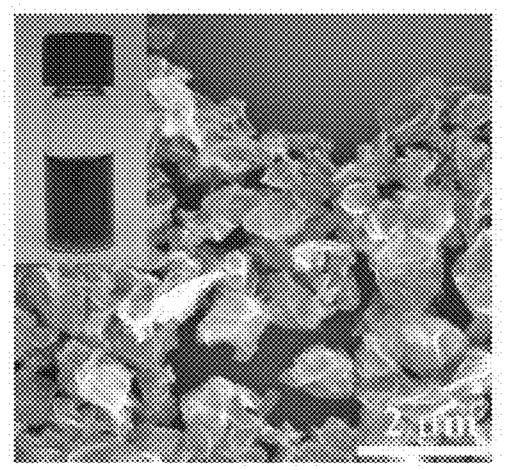
FIG. 8A shows a SEM image of the crumpled r-GO particles according to one embodiment of the present invention, where the crumpled r-GO particles are compressed at 2 GPa.
Figure 8B:
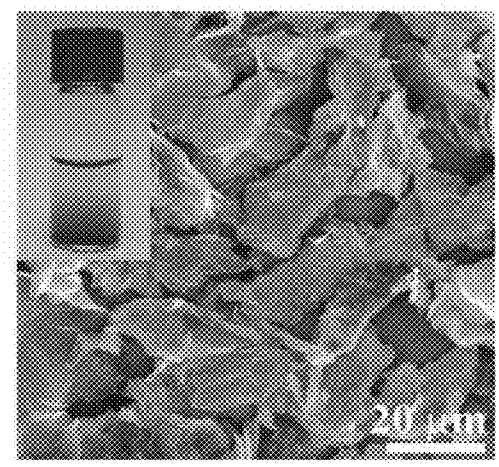
FIG. 8B shows a SEM image of regular flat r-GO sheets according to a comparative embodiment, where regular flat r-GO sheets are compressed at 2 GPa.

FIG. 8A shows a SEM image of the crumpled r-GO particles according to one embodiment of the present invention, and FIG. 8B shows a SEM image of regular flat r-GO sheets according to a comparative embodiment. In both cases, the crumpled r-GO particles and the regular flat r-GO sheets were compressed at 2 GPa. As shown in FIG. 8A, the crumpled r-GO particles do not aggregate even after being compressed at 2 GPa. Therefore, they can be readily dispersed in solvents by gentle hand-shaking. In contrast, as shown in FIG. 8B, the regular flat graphene sheets became heavily aggregated, forming very large chunks of tens of microns in diameter that cannot be processed in solvents.

Figure 9A:
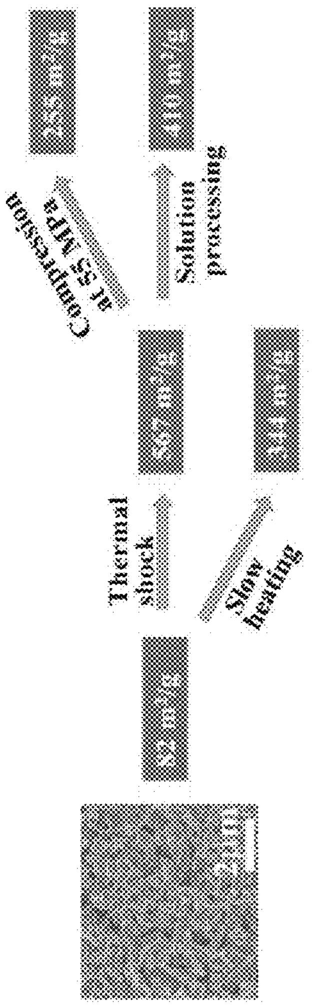
FIG. 9A shows a flowchart of synthesizing crumpled GO particles according to one embodiment of the present invention, where the crumpled GO particles went through various material processing conditions including heating (at different rates), solution processing, and mechanical compression.
Figure 9B:
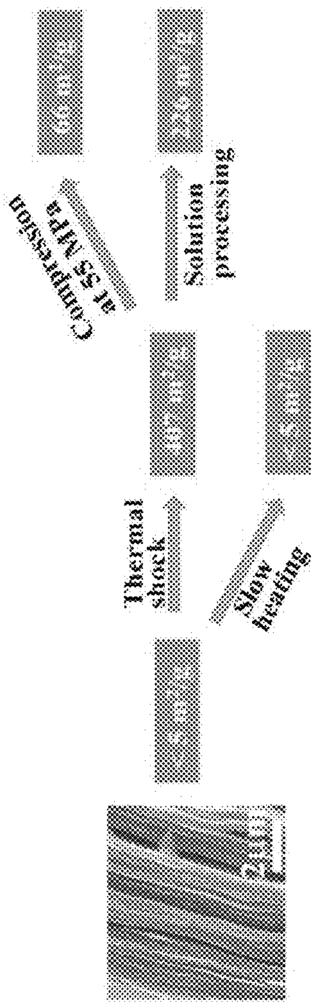
FIG. 9B shows a flowchart of regular flat GO sheets according to a comparative embodiment, where the regular flat GO sheets went through various material processing conditions including heating (at different rates), solution processing, and mechanical compression.

FIG. 9A shows a flowchart of crumpled GO particles according to one embodiment of the present invention, and FIG. 9B shows a flowchart of regular flat GO sheets according to a comparative embodiment. In both cases, the crumpled GO particles and the regular flat GO sheets went through various material processing conditions including heating (at different rates), solution processing, and mechanical compression.

The ease of aggregation of flat graphene-based sheets makes their properties, especially the surface area extremely sensitive to their processing history. As shown in FIG. 9A, after reduction, the crumpled particles maintained high surface area, regardless of the processing history. The crumpled GO balls already had a significantly higher starting surface area of about 82 $m^2/g$ due to their open structures, and they always yielded high surface area graphene products regardless of heating rate.

In contrast, as shown in FIG. 9B, the starting GO sheets tightly stacked into a paper-like material, yielding a low specific surface area (<5 $m^2/g$). If slowly heated, the resulting graphene product was poorly exfoliated and also had a very low surface area (<5 $m^2/g$). To produce high surface area graphene, GO usually needs to be rapidly heated to trigger violent gas evolution for efficient exfoliation. After thermal shock, the surface area of the graphene product increased dramatically to 407 $m^2/g$, which however was reduced by 44% to 226 $m^2/g$ after just one step of solution processing (i.e. dispersing and drying) in methanol. Pelletizing the product at 55 MPa eliminated 84% of its original surface area, resulting in a low value of only 66 $m^2/g$. In sum, the specific surface area of the sheet-like sample was highly dependent on processing history, and was lowered by 44% after only one step of solution processing, and drastically reduced by 84% after one step of compression at 55 MPa. Compared to the graphene sheets, crumpled balls had consistently higher and much more stable surface areas after the same processing steps. It should be noted that for both GO samples, the surface-adsorbed water would result in lower BET surface areas than their graphene products.

With their near-isotropic contour, remarkable aggregation-resistant behaviors and robust high surface area, properties of crumpled graphene balls have much less dependence on material processing history, therefore could help to standardize graphene-based materials, which will be critical for their large scale production [24]. They can undergo common powder processing techniques such as solvent dispersion, molding, pelleting and blending with other materials without significantly deteriorating properties, therefore should be beneficial for many applications such as polymer composites [16], catalytic supports [25], and electrodes [26-28] for batteries, capacitors or fuel cells.

Figure 10A:
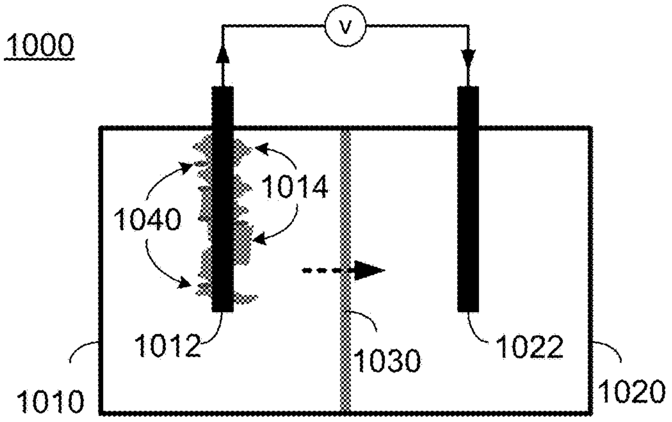
FIG. 10A shows schematically a MFC according to one embodiment of the present invention.

An application example of the crumpled particles of the present invention is a MFC utilizing crumpled graphene-modified anodes, with the crumpled particles as the material of a part of the anode. FIG. 10A shows schematically a MFC according to one embodiment of the present invention. According to FIG. 10A, the microbial fuel cell 1000 includes: an anode chamber 1010 having an anode 1012; a cathode chamber 1020 having a cathode 1022; a cation exchange membrane 1030 disposed between the anode chamber 1010 and the cathode chamber 1020; and a plurality of electricigenic microbes 1040 disposed on the anode 1012 to increase a power density of the microbial fuel cell 1000. At least a part of the anode 1012 is formed by the crumpled particles. As shown in FIG. 10A, the surface of the anode 1012 has protrusions 1014 formed by the crumpled particles.

For comparison purposes, the MFC 1000 according to one embodiment of the present invention and comparative MFCs were constructed. Each chamber 1010 and 1020 had a liquid volume of 120 ml. Commonly used carbon cloth anode 1012 (1.5 cm×3 cm) was modified with activated carbon and regular flat r-GO as the comparative embodiments, and with crumpled r-GO as the embodiment of the present invention, respectively, to improve its performance. A carbon brush was used as the cathode electrode 1022. The MFCs were operated in batch mode at room temperature. For each MFC, the anode was inoculated with the anaerobic sludge from a local municipal wastewater treatment plant (South Shore Wastewater Treatment Plant, Milwaukee, Wis., USA). The nutrient solution in the anode chamber contained sodium acetate as organic source and other mineral elements [30]. The cathodic chamber was filled with potassium ferricyanide. All electrochemical tests were performed using a Gamry Reference 600 potentiostat.

Figure 10B:
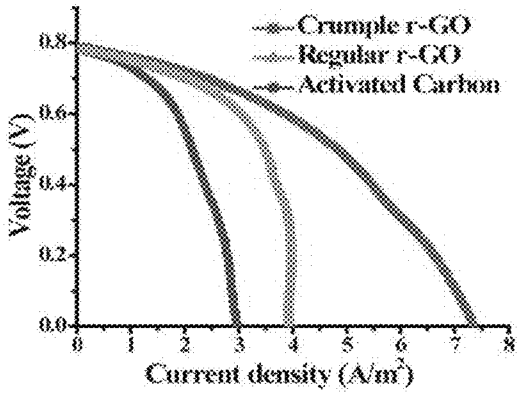
FIG. 10B shows a chart of voltage-current density relationships of the MFC according to one embodiment of the present invention and MFCs according to comparative embodiments.
Figure 10C:
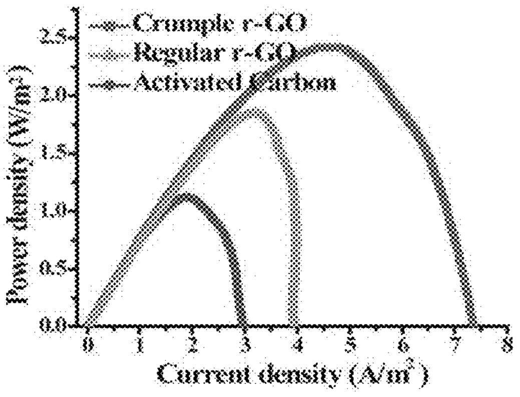
FIG. 10C shows a chart of polarization curves of the MFC according to one embodiment of the present invention and MFCs according to comparative embodiments.

FIG. 10B shows a chart of voltage-current density relationships of the MFC according to one embodiment of the present invention and MFCs according to comparative embodiments, and FIG. 10C shows a chart of polarization curves of the MFC according to one embodiment of the present invention and MFCs according to comparative embodiments. As shown in FIG. 10B, compared to MFCs using regular flat r-GO sheets or activated carbon, the MFC using crumpled particles produce about twice of the short-circuit current. Further, as shown in FIG. 10C, polarization curves show that the maximum power density of MFC made with crumpled r-GO anode is 31% and 116% higher than that prepared with regular flat r-GO and activated carbon, respectively.

Compared to the commonly used anode modifiers such as activated carbon, crumpled graphene particles can offer many advantages because they provide not only high electron conductivity and high accessible surface area in solution, but also allow rapid mass transfer of the fuels and ions due to their open structure. In addition, they pack into a solid with rough surface, which can facilitate microbial diffusion and colonization. Indeed, anode modified by the crumpled graphene particles delivered superior performances of electricity generation to those covered with activated carbon and regular sheet-like graphene, leading to significantly higher short-circuit current and maximum power density, as shown in FIGS. 10B and 10C.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. For example, multiple probes may be utilized at the same time to practice the present invention. Accordingly, the scope of the present invention is defined by the appended claims rather than the foregoing description and the exemplary embodiments described therein.

REFERENCE LIST

[1]. Lobkovsky, A., Gentges, S., Li, H., Morse, D. & Witten, T. A. Scaling Properties of Stretching Ridges in a Crumpled Elastic Sheet. *Science* 270, 1482-1485, (1995).

[2]. Matan, K., Williams, R. B., Witten, T. A. & Nagel, S. R. Crumpling a thin sheet. *Phys. Rev. Lett.* 88, 076101, (2002).

[3]. Vliegenthart, G. A. & Gompper, G. Forced crumpling of self-avoiding elastic sheets. *Nature Mater.* 5, 216-221, (2006).

[4]. Tallinen, T., Astrom, J. A. & Timonen, J. The effect of plasticity in crumpling of thin sheets. *Nature Mater.* 8, 25-29, (2009).

[5]. Park, S. & Ruoff, R. S. Chemical methods for the production of graphenes. *Nature Nanotech.* 4, 217-224, (2009).

[6]. Li, D. & Kaner, R. B. Graphene-Based Materials. *Science* 320, 1170-1171, (2008).

[7]. Compton, O. C. & Nguyen, S. T. Graphene Oxide, Highly Reduced Graphene Oxide, and Graphene: Versatile Building Blocks for Carbon-Based Materials. *Small* 6, 711-723, (2010).

[8]. Li, D., Muller, M. B., Gilje, S., Kaner, R. B. & Wallace, G. G. Processable aqueous dispersions of graphene nanosheets. *Nature Nanotech.* 3, 101-105, (2008).

[9]. Tung, V. C., Allen, M. J., Yang, Y. & Kaner, R. B. High-throughput solution processing of large-scale graphene. *Nature Nanotech.* 4, 25-29, (2009).

[10]. Luo, J. Y. et al. Graphene Oxide Nanocolloids. *J. Am. Chem. Soc.* 132, 17667-17669, (2010).

[11]. Hamilton, C. E., Lomeda, J. R., Sun, Z. Z., Tour, J. M. & Barron, A. R. High-Yield Organic Dispersions of Unfunctionalized Graphene. *Nano Lett.* 9, 3460-3462, (2009).

[12]. Wen, X. et al. Crumpled and Collapsed Conformations in Graphite Oxide Membranes. *Nature* 355, 426-428, (1992).

[13]. Spector, M. S., Naranjo, E., Chiruvolu, S. & Zasadzinski, J. A. Conformations of a Tethered Membrane—Crumpling in Graphitic Oxide? *Phys. Rev. Lett.* 73, 2867-2870, (1994).

[14]. Cote, L. J., Kim, J., Zhang, Z., Sun, C. & Huang, J. X. Tunable assembly of graphene oxide surfactant sheets: wrinkles, overlaps and impacts on thin film properties. *Soft Matter* 6, 6096-6101, (2010).

[15]. Schniepp, H. C. et al. Functionalized single graphene sheets derived from splitting graphite oxide. *J. Phys. Chem. B* 110, 8535-8539, (2006).

[16]. Stankovich, S. et al. Graphene-based composite materials. *Nature* 442, 282-286, (2006).

[17]. Kim, J., Cote, L. J., Kim, F. & Huang, J. Visualizing Graphene Based Sheets by Fluorescence Quenching Microscopy. *J. Am. Chem. Soc.* 132, 260-267, (2010).

[18]. Jang, H. D. et al. Co-Assembly of Nanoparticles in Evaporating Aerosol Droplets: Preparation of Nanoporous Pt/TiO2 Composite Particles. *Aerosol Sci. Technol.* 44, 1140-1145, (2010).

[19]. Deegan, R. D. et al. Capillary flow as the cause of ring stains from dried liquid drops. *Nature* 389, 827-829, (1997).

[20]. Kim, F. et al. Self-Propagating Domino-like Reactions in Oxidized Graphite. *Adv. Funct. Mater.* 20, 2867-2873, (2010).

[21]. Jung, I. et al. Reduction Kinetics of Graphene Oxide Determined by Electrical Transport Measurements and Temperature Programmed Desorption. *J. Phys. Chem. C* 113, 18480-18486, (2009).

[22]. Zhu, Y. W. et al. Microwave assisted exfoliation and reduction of graphite oxide for ultracapacitors. *Carbon* 48, 2118-2122, (2010).

[23]. Ajayan, P. M. & Iijima, S. Smallest Carbon Nanotube. *Nature* 358, 23-23, (1992).

[24]. Segal, M. Selling graphene by the ton. *Nature Nanotech.* 4, 611-613, (2009).

[25]. Kou, R. et al. Stabilization of Electrocatalytic Metal Nanoparticles at Metal-Metal Oxide-Graphene Triple Junction Points. *J. Am. Chem. Soc.* 133, 2541-2547, (2011).

[26]. Stoller, M. D., Park, S. J., Zhu, Y. W., An, J. H. & Ruoff, R. S. Graphene-Based Ultracapacitors. *Nano Lett.* 8, 3498-3502, (2008).

[27]. Vivekchand, S. R. C., Rout, C. S., Subrahmanyam, K. S., Govindaraj, A. & Rao, C. N. R. Graphene-based electrochemical supercapacitors. *J Chem Sci* 120, 9-13, (2008).

[28]. Liu, C. G., Yu, Z. N., Neff, D., Zhamu, A. & Jang, B. Z. Graphene-Based Supercapacitor with an Ultrahigh Energy Density. *Nano Lett.* 10, 4863-4868, (2010).

[29]. Hummers, W. S. & Offeman, R. E. Preparation of Graphitic Oxide. *J. Am. Chem. Soc.* 80, 1339-1339, (1958).

[30]. Zhang, F., Jacobson, K. S., Torres, P. & He, Z. Effects of anolyte recirculation rates and catholytes on electricity generation in a liter-scale upflow microbial fuel cell. *Energ Environ Sci* 3, 1347-1352, (2010).

What is claimed is:

1. A method of synthesizing crumpled particles, comprising:

forming a dispersion comprising sheets of a graphene-based material dispersed in a liquid, the graphene-based material comprising micron-sized graphene oxide (GO);

nebulizing the dispersion to form aerosol droplets; and heating the droplets by flowing the droplets through a furnace pre-heated at a predetermined temperature, using a carrier gas, so that substantially all of the sheets are isotropically crumpled and compressed into crumpled particles having a diameter of less than 1 micron, while suspended in the carrier gas.

2. The method of claim 1, further comprising collecting the crumpled particles in a filter at an exhaust of the furnace, wherein a flow rate of the carrier gas is equal to or greater than 1 liter/min.

3. The method of claim 1, wherein the liquid of the dispersion is selected from the group consisting of water, methanol, isopropanol, acetone, chloroform, tetrahydrofuran, toluene, cyclohexane, dichlorobenzene, ethylene glycol, and mixtures thereof.

4. The method of claim 1, wherein each of the droplets forms a different one of the crumpled particles.

5. The method of claim 1, wherein the crumpled particles have fractal-dimensional crumpled ball structures.

6. The method of claim 1, wherein the isotropically crumpled and compressed sheets are connected by $\pi$-$\pi$ stacked ridges in the crumpled particles.

7. The method of claim 1, wherein the crumpled particles are substantially aggregation-resistant in solution or solid state, and remain substantially intact and dispersible after chemical treatments, wet processing, annealing and pelletizing at high pressures.

8. The method of claim 1, wherein when pelletized, the crumpled particles form a piece of isotropic, black solid with rough microstructures at both the surface and cross section.

9. The method of claim 1, wherein the dispersion is nebulized with an ultrasonic atomizer.

10. The method of claim 1, wherein the predetermined temperature is in a range of about 20° C. to about 2000° C.

11. The method of claim 1, wherein the sheets are crumpled and compressed by an aerosol assisted capillary compression process resulting from the evaporation of the droplets while in the carrier gas.

12. The method of claim 1, wherein the carrier gas is $N_2$.

13. The method of claim 1, wherein the sheets in the droplets are distributed in a coffee-ring pattern before entering the furnace.

14. The method of claim 1, wherein the crumpled particles comprise GO, reduced graphene oxide (r-GO), or a combination thereof.

15. A method of synthesizing particles, comprising:

forming a dispersion comprising micron-sized sheets of a graphene-based material dispersed in a liquid;

aerosolizing the dispersion into a carrier gas flowing through a tube furnace, to form droplets suspended in the carrier gas; and evaporating the liquid from droplets of the aerosolized dispersion in the tube furnace, while the droplets are suspended in the carrier gas, such that the sheets are isotropically compressed into crumpled particles having a diameter of less than 1 micron, comprising graphene oxide (GO), reduced graphene oxide (r-GO), or a combination thereof, wherein a flowrate of the carrier gas and a temperature of the tube furnace are sufficient to prevent contact between the droplets and walls of the tube furnace from disrupting the isotropic compression of substantially all of the sheets.

16. The method of claim 15, wherein the sheets in the droplets are distributed in a coffee-ring pattern before entering the furnace.

17. The method of claim 15, wherein the crumpled particles have fractal-dimensional crumpled ball structures.

18. The method of claim 15, wherein the crumpled particles have π-π stacked ridges.

19. The method of claim 15, wherein the crumpled particles are substantially aggregation-resistant in solution or solid state, and remain substantially intact and dispersible after chemical treatments, wet processing, annealing and pelletizing at high pressure.

20. The method of claim 15, wherein when pelletized, the crumpled particles form a piece of isotropic, black solid with rough microstructures at both the surface and cross section.

21. The method of claim 15, wherein the flow rate of the carrier gas is equal to or greater than 1 liter/min.

22. The method of claim 15, wherein the droplets are formed by nebulizing the dispersion.

23. The method of claim 22, wherein the dispersion is nebulized with an ultrasonic atomizer.

24. The method of claim 15, further comprising collecting the crumpled particles in a filter at an exhaust of the pre-heated channel.

25. The method of claim 15, wherein the dispersion comprises water.

26. The method of claim 15, wherein the furnace is a horizontal tube furnace.

27. The method of claim 15, wherein each crumpled particle is formed by a different one of the droplets.

28. The method of claim 15, wherein the furnace is heated to a temperature ranging from about 20° C. to about 2000° C.

29. The method of claim 28, wherein the sheets are crumpled and compressed by aerosol assisted capillary compression resulting from the evaporation of the liquid from the droplets.

30. The method of claim 15, wherein the carrier gas is $N_2$.

31. The method of claim 15, wherein the graphene-based material comprises sheets of GO.

32. The method of claim 1, further comprising heating the graphene-based material to trigger explosive exfoliation of the graphene-based material into sheets, before forming the dispersion.

33. The method of claim 1, wherein the crumpled particles comprise nanoshells.

34. The method of claim 1, wherein the synthesis of the crumpled particles comprises:

a first stage that occurs outside the furnace, immediately before an entrance of the furnace, wherein the sheets of the graphene-based material distribute in a ring pattern;

a second stage that occurs inside the furnace, near the furnace entrance, wherein the sheets of the graphene-based material distribute in a clustered and tiled pattern;

a third stage that occurs at about a middle location within the furnace, wherein the sheets of the graphene-based material concentrate, aggregate, and wrinkle; and a fourth stage that occurs within the furnace, near an exit of the furnace, wherein the graphene-based material sheets compress and crumple.

35. The method of claim 1, wherein a concentration of the sheets of the graphene oxide in the liquid of the aerosol droplets ranges from about 0.2 mg/ml to about 5 mg/ml.

* * * * *